(12) United States Patent
Rahimpour et al.

(10) Patent No.: US 11,981,326 B2
(45) Date of Patent: May 14, 2024

(54) OBJECT IDENTIFICATION WITH THERMAL IMAGING

(71) Applicant: Ford Global Technologies, LLC, Dearborn, MI (US)

(72) Inventors: Alireza Rahimpour, Palo Alto, CA (US); Devesh Upadhyay, Canton, MI (US); Jonathan Diedrich, Carleton, MI (US); Mark Gehrke, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 460 days.

(21) Appl. No.: 17/210,927

(22) Filed: Mar. 24, 2021

(65) Prior Publication Data
US 2022/0306088 A1  Sep. 29, 2022

(51) Int. Cl.
*B60W 30/00* (2006.01)
*B60W 10/18* (2012.01)
(Continued)

(52) U.S. Cl.
CPC ............ *B60W 30/09* (2013.01); *B60W 10/18* (2013.01); *B60W 30/0956* (2013.01); *B60W 50/0097* (2013.01); *B60W 50/14* (2013.01); *G06N 20/00* (2019.01); *B60W 10/04* (2013.01); *B60W 10/20* (2013.01); *B60W 2050/146* (2013.01);
(Continued)

(58) Field of Classification Search
CPC .. B60W 30/09; B60W 10/18; B60W 30/0956; B60W 50/0097; B60W 50/14; B60W 10/04; B60W 10/20; B60W 2050/146; B60W 2420/42; B60W 2554/80; B60W 2555/20; B60W 2554/402; G06N 20/00; G06N 3/045; G06N 3/084; G06V 10/25; G06V 20/58; G06V 10/774
See application file for complete search history.

(56) References Cited

U.S. PATENT DOCUMENTS 6,163,755 A  12/2000 Peer et al.
10,152,649 B2  12/2018 Shambik et al.
(Continued)

FOREIGN PATENT DOCUMENTS

CN  104442571 A  *  3/2015  ............... B60Q 9/00

OTHER PUBLICATIONS

Y. Munian, A. Martinez-Molina and M. Alamaniotis, "Intelligent System for Detection of Wild Animals Using Hog and CNN in Automobile Applications," 2020 11th International Conference on Information, Intelligence, Systems and Applications (IISA, Piraeus, Greece, 2020, pp. 1-8 (Year: 2020).*

*Primary Examiner* — Elaine Gort
*Assistant Examiner* — Brittany Renee Peko
(74) *Attorney, Agent, or Firm* — Frank A. MacKenzie; Bejin Bieneman PLC (57) ABSTRACT

A plurality of thermal images forward of a vehicle are collected. Thermal data in the plurality of thermal images is normalized based on an ambient air temperature to generate a plurality of normalized thermal images. The plurality of normalized thermal images are input to a machine learning program trained to output an identification of an object based on the ambient air temperature and a risk of collision between the vehicle and the object. A vehicle component is actuated based on the identification of the object and the risk of collision with the object.

18 Claims, 7 Drawing Sheets

(51) Int. Cl.
| | |
|---|---|
| *B60W 30/09* | (2012.01) |
| *B60W 30/095* | (2012.01) |
| *B60W 50/00* | (2006.01) |
| *B60W 50/14* | (2020.01) |
| *G06N 20/00* | (2019.01) |
| *B60W 10/04* | (2006.01) |
| *B60W 10/20* | (2006.01) |

(52) U.S. Cl.
CPC ..... *B60W 2420/42* (2013.01); *B60W 2554/80* (2020.02); *B60W 2555/20* (2020.02)

(56) References Cited

U.S. PATENT DOCUMENTS

| | | | |
|---|---|---|---|
| 2011/0249119 A1* | 10/2011 | Forslund | H04N 7/18 |
| | | | 348/148 |
| 2012/0127309 A1* | 5/2012 | Lee | G06K 9/46 |
| | | | 348/148 |
| 2014/0074359 A1 | 3/2014 | Lane | |
| 2017/0011368 A1 | 4/2017 | Banvait et al. | |
| 2020/0066159 A1* | 2/2020 | Chase | G08G 1/166 |
| 2020/0143551 A1* | 5/2020 | Gonzalez Aguirre | G06T 7/37 |
| 2022/0012988 A1* | 1/2022 | Avadhanam | G08B 3/10 |
| 2022/0101635 A1* | 3/2022 | Koivisto | G06V 20/58 |
| 2022/0189034 A1* | 6/2022 | Price | G06T 7/13 |
| 2022/0214222 A1* | 7/2022 | Tauber | G01J 5/04 |
| 2022/0222475 A1* | 7/2022 | Oesterling | G06K 9/00805 |

* cited by examiner

OBJECT IDENTIFICATION WITH THERMAL IMAGING

BACKGROUND

Vehicles can be equipped with computing devices, networks, sensors and controllers to acquire data regarding the vehicle's environment and to operate the vehicle based on the data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated on a roadway. Vehicles may use computing devices configured to identify objects from image data collected by the vehicle sensors.

DETAILED DESCRIPTION

A system includes a computer including a processor and a memory, the memory storing instructions executable by the processor to collect a plurality of thermal images forward of a vehicle, normalize thermal data in the plurality of thermal images based on an ambient air temperature to generate a plurality of normalized thermal images, input the plurality of normalized thermal images to a machine learning program trained to output an identification of an object based on the ambient air temperature and a risk of collision between the vehicle and the object, and actuate a vehicle component based on the identification of the object and the risk of collision with the object.

The object can be an animal, and the risk of collision can be based on predicted trajectory of the animal, the predicted trajectory of the animal based on a difference of thermal data between a specified set of pixels in a first normalized thermal image and a second specified set of pixels a second normalized thermal image.

The instructions can further include instructions to determine a distance to the object and a predicted trajectory of the object based on the normalized thermal images and to input the distance and the predicted trajectory to the machine learning program, the machine learning program being trained to output the risk of collision with the object based on the distance and the predicted trajectory.

The instructions can further include instructions to predict a trajectory of the vehicle and to input the predicted trajectory of the vehicle to the machine learning program, the machine learning program being trained to output the risk of collision with the object based on the predicted trajectory of the object and the predicted trajectory of the vehicle.

The instructions can further include instructions to identify the object based on the thermal data in the plurality of normalized thermal images indicating a temperature exceeding the ambient air temperature.

The instructions can further include instructions to identify a region of interest in each normalized thermal image based on one or more previously determined object properties.

The instructions can further include instructions to actuate a brake based on the risk of collision with the object.

The instructions can further include instructions to divide each of the plurality of normalized thermal images into a plurality of subregions, each subregion having a respective infrared intensity threshold based on infrared data in the subregion, and to assign one or more pixels in the subregion to a region of interest based on the infrared data of the pixel and the infrared intensity threshold.

The instructions can further include instructions to provide an output to a display screen based on the risk of collision with the object.

The instructions can further include instructions to generate a bounding box enclosing the object.

The instructions can further include instructions to identify a current location of the vehicle and to output the identification of the object based on the current location of the vehicle.

The instructions can further include instructions to identify the current location of the vehicle as one of an urban environment or a rural environment, to output the identification of the object as a pedestrian when the current location is the urban environment, and to output the identification of the object as an animal when the current location is a rural environment.

A method includes collecting a plurality of thermal images forward of a vehicle; normalize thermal data in the plurality of thermal images based on an ambient air temperature to generate a plurality of normalized thermal images, inputting the plurality of normalized thermal images to a machine learning program trained to output an identification of an object based on the ambient air temperature and a risk of collision with the object, and actuating a vehicle component based on the identification of the object and the risk of collision with the object.

The method can further include determining a distance to the object and a predicted trajectory of the object based on the normalized thermal images and inputting the distance and the predicted trajectory to the machine learning program, the machine learning program being trained to output the risk of collision with the object based on the distance and the predicted trajectory.

The method can further include predicting a trajectory of the vehicle and inputting the predicted trajectory of the vehicle to the machine learning program, the machine learning program being trained to output the risk of collision with the object based on the predicted trajectory of the object and the predicted trajectory of the vehicle.

The method can further include identifying the object based on the thermal data in the plurality of normalized thermal images indicating a temperature exceeding the ambient air temperature.

The method can further include identifying a region of interest in each normalized thermal image based on one or more previously determined object properties.

The method can further include actuating a brake based on the risk of collision with the object.

The method can further include dividing each of the plurality of normalized thermal images into a plurality of subregions, each subregion having a respective infrared intensity threshold based on infrared data in the subregion, and assigning one or more pixels in the subregion to a region of interest based on the infrared data of the pixel and the infrared intensity threshold.

The method can further include providing an output to a display screen based on the risk of collision with the object.

The method can further include generating a bounding box enclosing the object.

The method can further include identifying a current location of the vehicle and outputting the identification of the object based on the current location of the vehicle.

The method can further include identifying the current location of the vehicle as one of an urban environment or a rural environment, outputting the identification of the object as a pedestrian when the current location is the urban environment, and outputting the identification of the object as an animal when the current location is a rural environment.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

Vehicles can detect objects on a roadway with data from one or more image sensors and thereby avoid and/or mitigate collisions with the animals. For example, a vehicle can include a thermal imaging sensor to detect animals that emit detectable thermal radiation in a surrounding environment. Based on the data from the thermal imaging sensor, a computer in the vehicle can actuate one or more components to avoid the animal. Animals may be occluded by parts of the environment that emit less thermal radiation; as disclosed herein, where the computer may not identify the animal based on a single frame of thermal image data, inputting a succession or series of images to a machine learning program can address the difficulties that can arise from incomplete or occluded images.

A machine learning program that uses deep learning to identify regions of interest in thermal images that may include objects can more quickly identify the objects than a conventional method using the thermal data alone, and the computer can actuate one or more components to avoid the object based on the output from the machine learning program. The computer can normalize the thermal images based on an ambient air temperature, and the machine learning program can, based on adaptive thresholds of subregions of the thermal images, identify regions of interest in the thermal images. The computer can identify an object in one of the regions of interest. The computer can then predict a trajectory of the object based on changes to pixel intensities in successive thermal images. The computer can input the trajectory and the images to the machine learning program to output a risk of collision between the object and the vehicle. Based on this risk of collision, the computer can actuate one or more components to avoid and/or mitigate a collision with the object.

Further, by using an object learning program to identify objects in thermal images, the computer can identify animals at greater distances from the vehicle than a conventional technique using the thermal infrared data alone. Identifying regions of interest that are smaller than the entire thermal image reduces computations performed by the computer compared to a method that considers all data in the thermal image. Thus, the computer can identify and avoid objects on a roadway more quickly and with fewer computations than a conventional image processing technique.

Figure 1:
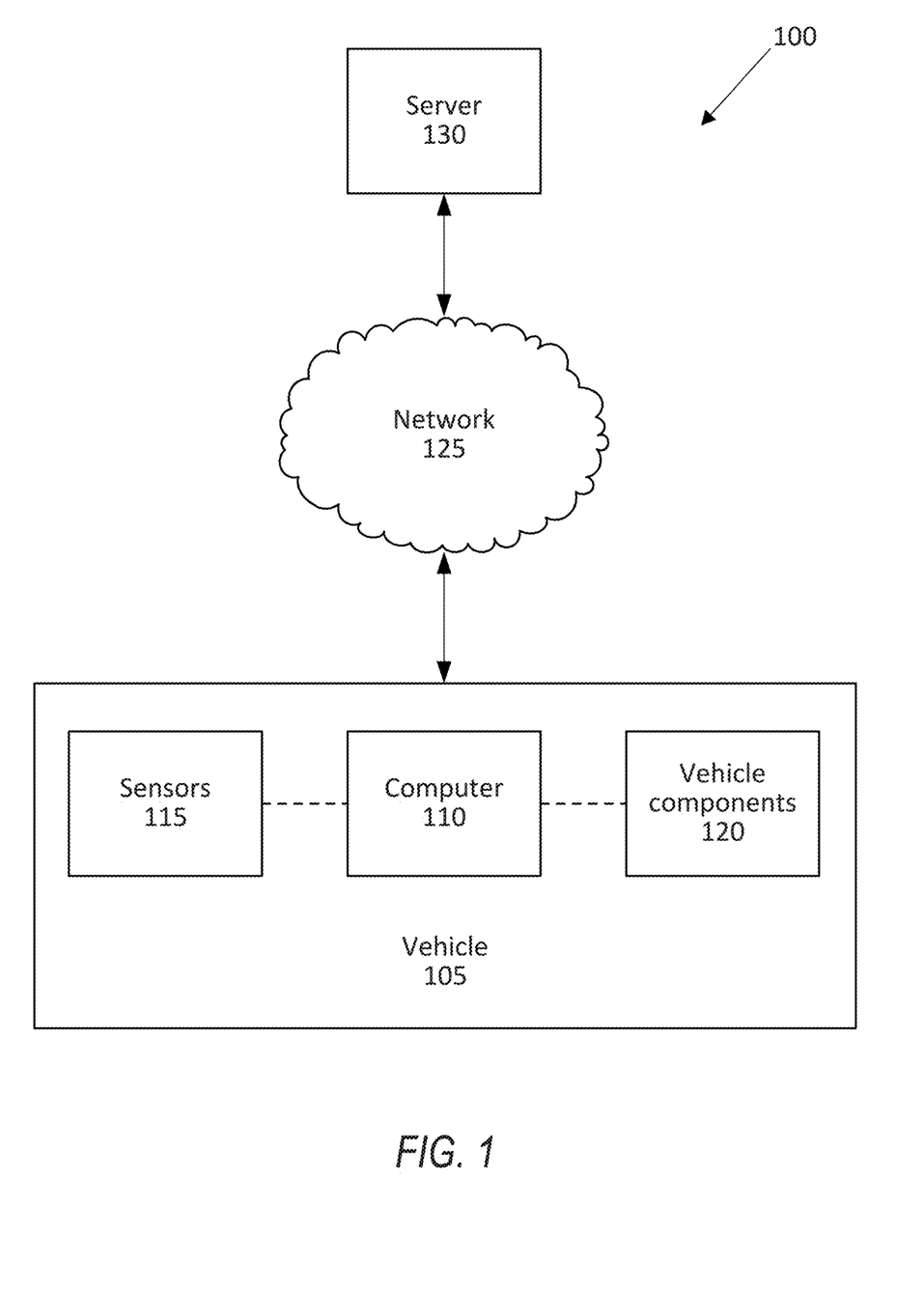
FIG. 1 is a block diagram of an example system for avoiding an object on a roadway.

FIG. 1 illustrates an example system 100 for operating a vehicle 105. A computer 110 in the vehicle 105 is programmed to receive collected data from one or more sensors 115. For example, vehicle 105 data may include a location of the vehicle 105, data about an environment around a vehicle, data about an object outside the vehicle such as another vehicle, etc. A vehicle 105 location is typically provided in a conventional form, e.g., geo-coordinates such as latitude and longitude coordinates obtained via a navigation system that uses the Global Positioning System (GPS). Further examples of data can include measurements of vehicle 105 systems and components, e.g., a vehicle 105 velocity, a vehicle 105 trajectory, etc.

The computer 110 is generally programmed for communications on a vehicle 105 network, e.g., including a conventional vehicle 105 communications bus such as a CAN bus, LIN bus, etc., and or other wired and/or wireless technologies, e.g., Ethernet, WIFI, etc. Via the network, bus, and/or other wired or wireless mechanisms (e.g., a wired or wireless local area network in the vehicle 105), the computer 110 may transmit messages to various devices in a vehicle 105 and/or receive messages from the various devices, e.g., controllers, actuators, sensors, etc., including sensors 115. Alternatively or additionally, in cases where the computer 110 actually comprises multiple devices, the vehicle network may be used for communications between devices represented as the computer 110 in this disclosure. For example, the computer 110 can be a generic computer with a processor and memory as described above and/or may include an electronic control unit (ECU) or controller or the like for a specific function or set of functions, and/or a dedicated electronic circuit including an ASIC that is manufactured for a particular operation, e.g., an ASIC for processing sensor data and/or communicating the sensor data. In another example, computer 110 may include an FPGA (Field-Programmable Gate Array) which is an integrated circuit manufactured to be configurable by an occupant. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in computer 110.

In addition, the computer 110 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The memory can be of any type, e.g., hard disk drives, solid state drives, servers, or any volatile or non-volatile media. The memory can store the collected data sent from the sensors 115. The memory can be a separate device from the computer 110, and the computer 110 can retrieve information stored by the memory via a network in the vehicle 105, e.g., over a CAN bus, a wireless network, etc. Alternatively or additionally, the memory can be part of the computer 110, e.g., as a memory of the computer 110.

Sensors 115 can include a variety of devices. For example, various controllers in a vehicle 105 may operate as sensors 115 to provide data via the vehicle 105 network or bus, e.g., data relating to vehicle speed, acceleration, location, subsystem and/or component status, etc. Further, other sensors 115 could include cameras, motion detectors, etc., i.e., sensors 115 to provide data for evaluating a position of a component, evaluating a slope of a roadway, etc. The sensors 115 could, without limitation, also include short range radar, long range radar, LIDAR, and/or ultrasonic transducers.

Collected data can include a variety of data collected in a vehicle 105. Examples of collected data are provided above, and moreover, data are generally collected using one or more sensors 115, and may additionally include data calculated therefrom in the computer 110, and/or at the server 130. In general, collected data may include any data that may be gathered by the sensors 115 and/or computed from such data.

The vehicle 105 can include a plurality of vehicle components 120. In this context, each vehicle component 120 includes one or more hardware components adapted to perform a mechanical function or operation—such as moving the vehicle 105, slowing or stopping the vehicle 105, steering the vehicle 105, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like. Components 120 can include computing devices, e.g., electronic control units (ECUs) or the like and/or computing devices such as described above with respect to the computer 110, and that likewise communicate via a vehicle 105 network.

A vehicle 105 can operate in one of a fully autonomous mode, a semiautonomous mode, or a non-autonomous mode. A fully autonomous mode is defined as one in which each of vehicle 105 propulsion (typically via a powertrain including an electric motor and/or internal combustion engine), braking, and steering are controlled by the computer 110. A semi-autonomous mode is one in which at least one of vehicle 105 propulsion (typically via a powertrain including an electric motor and/or internal combustion engine), braking, and steering are controlled at least partly by the computer 110 as opposed to a human operator. In a non-autonomous mode, i.e., a manual mode, the vehicle 105 propulsion, braking, and steering are controlled by the human operator.

The system 100 can further include a network 125 connected to a server 130. The computer 110 can further be programmed to communicate with one or more remote sites such as the server 130, via the network 125, such remote site possibly including a processor and a memory. The network 125 represents one or more mechanisms by which a vehicle computer 110 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
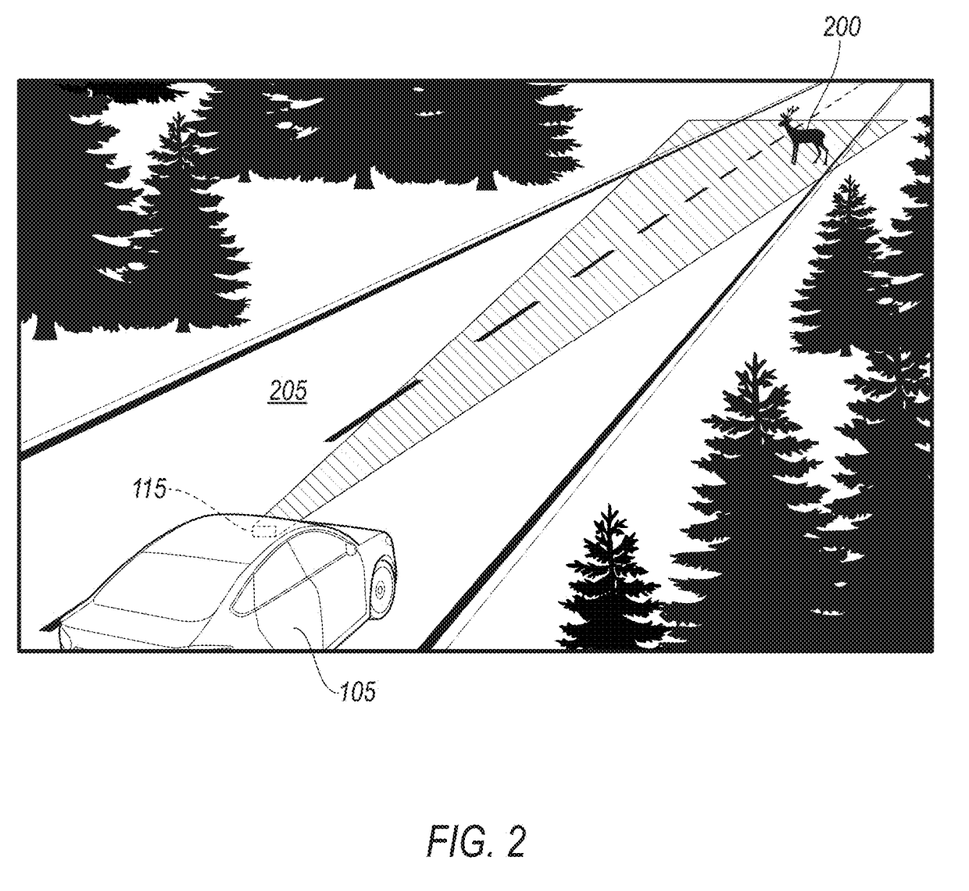
FIG. 2 is a perspective view of an example vehicle on the roadway.

FIG. 2 is a view of an example vehicle 105 detecting an object 200. The object 200 can be an animal moving through a roadway 205. The computer 110 can actuate one or more sensors 115 to detect the object 200 on the roadway. For example, the computer 110 can actuate a thermal imaging sensor 115 to collect a plurality of thermal images of the roadway 205. Objects 200 that are animals typically emit more thermal radiation than emitted by the surrounding environment, and the computer 110 can detect the objects 200 more quickly from the thermal images than a conventional visual light image sensor 115 such as a camera. For example, the thermal imaging sensor 115 can collect thermal infrared data when a visual light sensor 115 may not be able to collect light data, e.g., at night. Thus, using a thermal imaging sensor 115, the computer 110 can detect and avoid the object 200.

Figure 3:
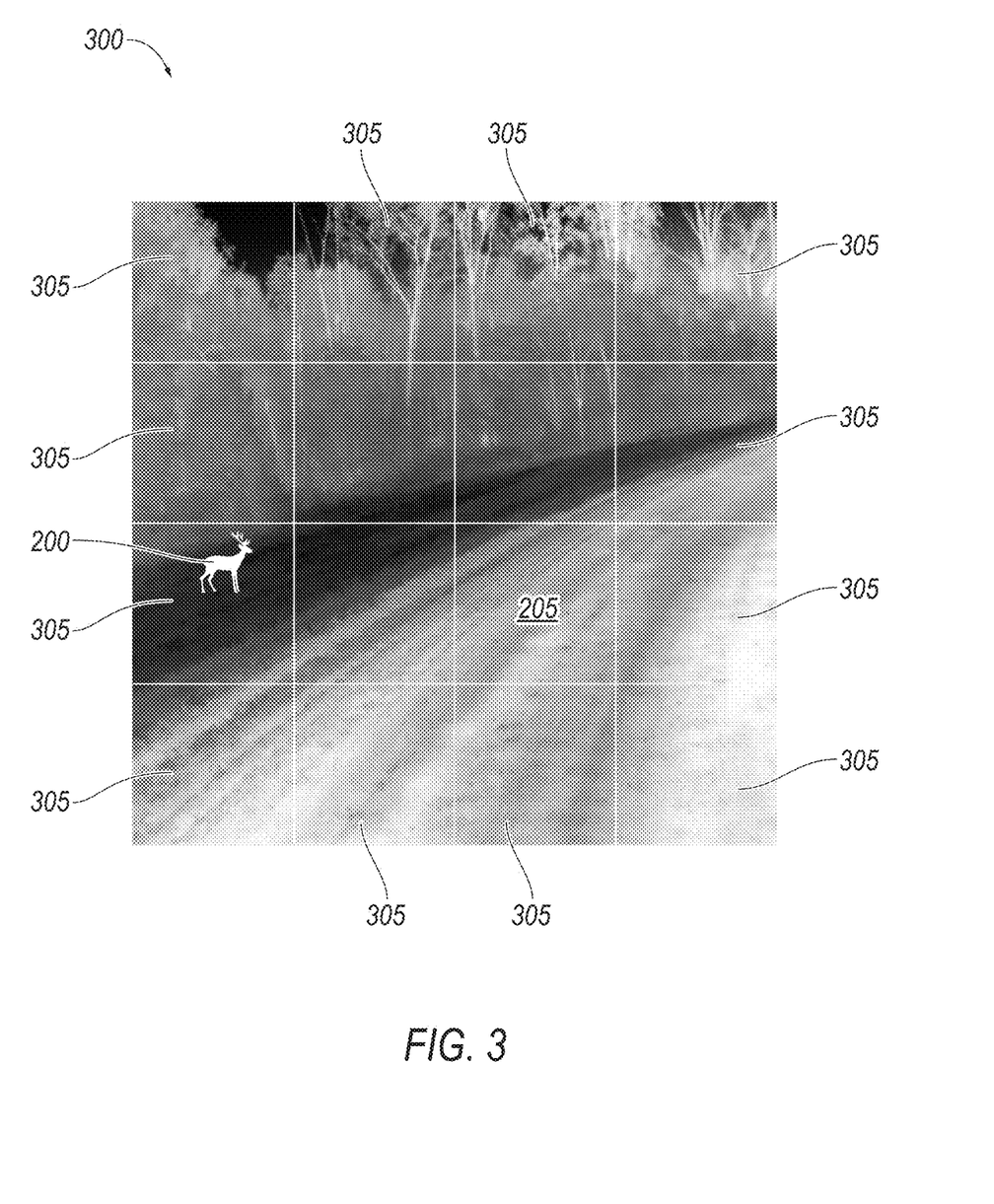
FIG. 3 is an example thermal image collected by a thermal imaging sensor of the example vehicle.
Figure 4:
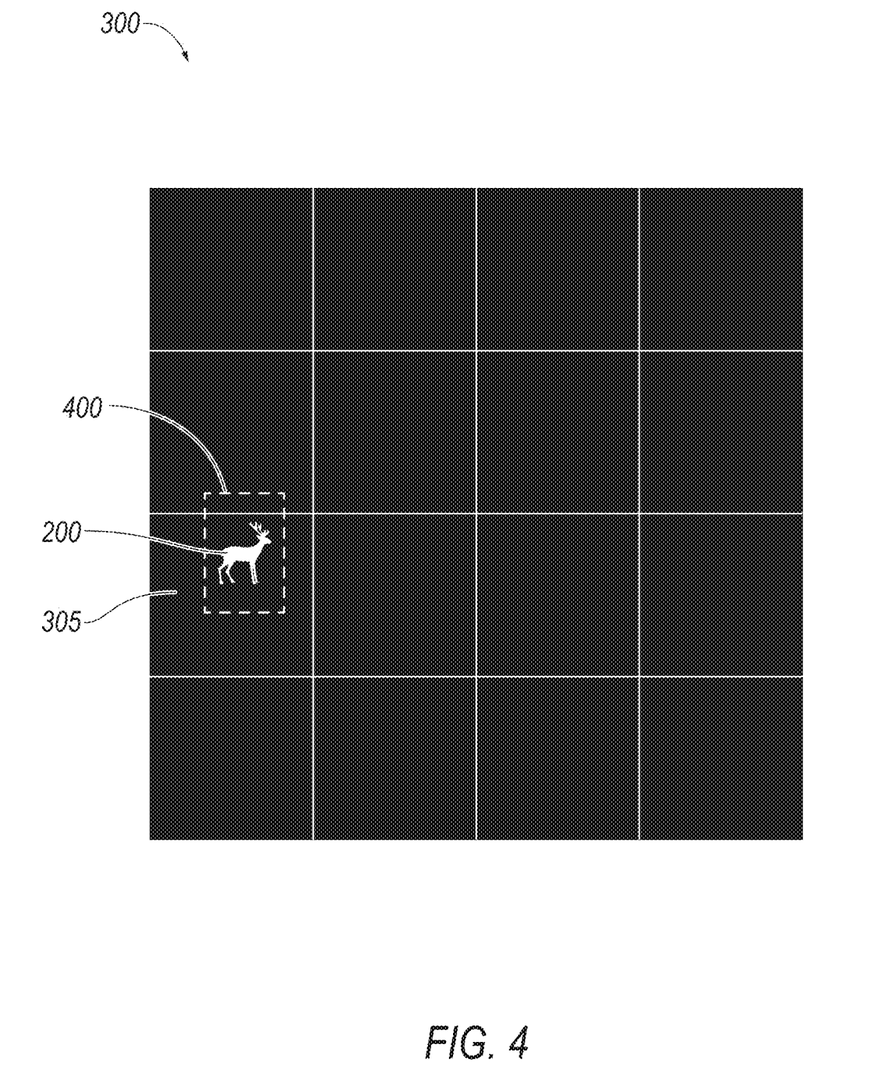
FIG. 4 is the example thermal image in which intensity thresholds are applied to each of a plurality of subregions.
Figure 5:
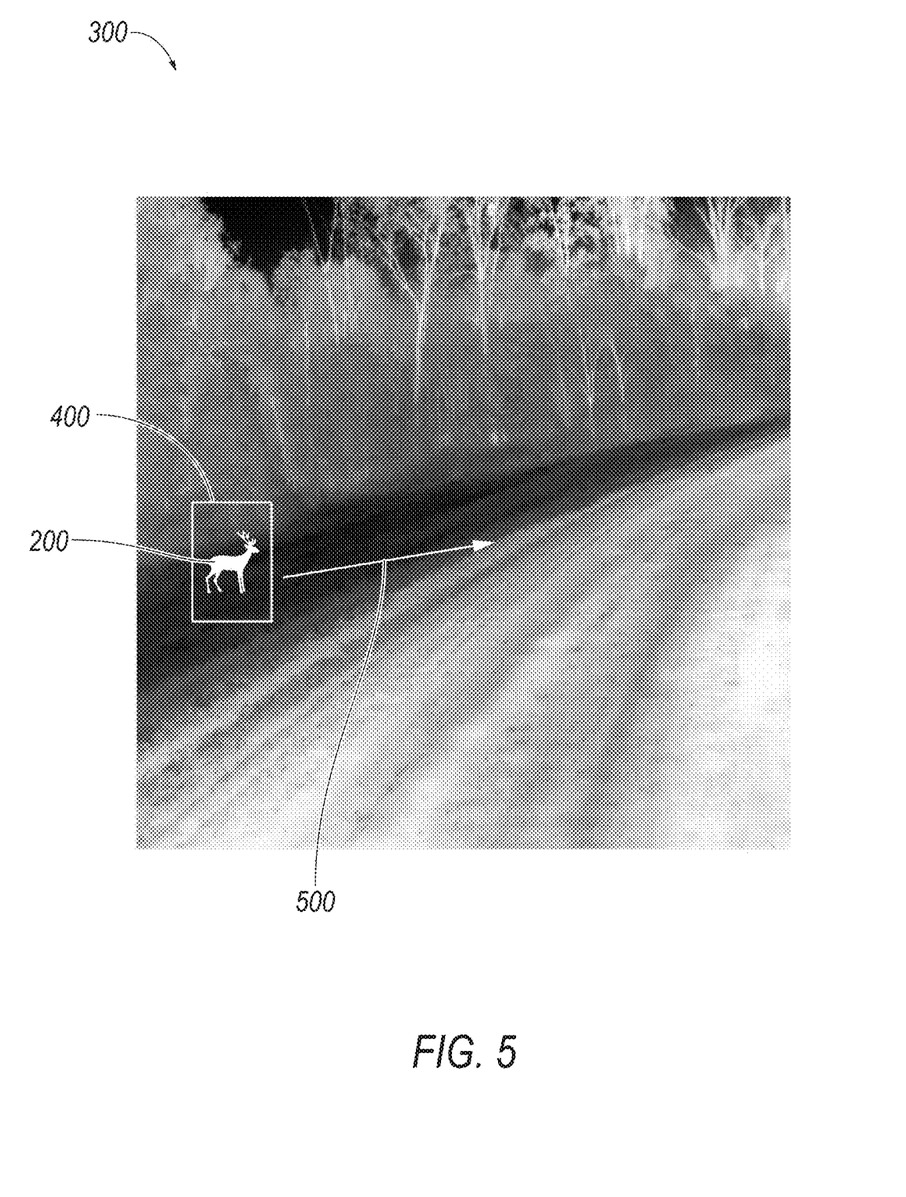
FIG. 5 is an example trajectory of an object in the example thermal image.

FIGS. 3-5 illustrate an example thermal image 300 collected by the thermal imaging sensor 115. The thermal image 300 is a two-dimensional array of grayscale values, each pixel of the array being a value between 0 and 255, where 0 is shown as completely black in the thermal image 300 and 255 is completely white in the thermal image 300. The computer 110 can generate the thermal image 300 based on thermal infrared data collected by the thermal imaging sensor 115. That is, the thermal imaging sensor 115 can detect infrared radiation emitted by objects 200 in the environment surrounding the vehicle 105, and the computer 110 can assign each pixel of the thermal image 300 to a value between 0 and 255 based on the detected thermal infrared data. The thermal infrared data in each pixel represents a specific temperature, e.g., a blackbody temperature based on an amount of infrared radiation detected in the pixel. For example, the computer 110 can normalize the thermal data based on an ambient air temperature. To "normalize" the thermal data means to scale, i.e., adjust, the thermal data according to the ambient air temperature. That is, the computer 110 can determine a temperature of ambient air around the vehicle 105 with a temperature sensor 115. The computer 110 can scale the thermal data based on the ambient air temperature, e.g., dividing each temperature value associated to infrared radiation values in the thermal data by the ambient air temperature, generating scaled thermal data that are multiples of the ambient air temperature. That is, a pixel that is at the ambient air temperature of 20 degrees Fahrenheit would become a scaled value of 1, a pixel that has a temperature of 70 degrees Fahrenheit (e.g., an animal emitting heat) would become a scaled value of 3.5, and a pixel that is at a temperature of 10 degrees Fahrenheit (e.g., snow), would become a scaled value of 0.5. Then, the computer 110 can assign values between 0 and 255 based on the scaled thermal data, e.g., the computer 110 can multiply the scaled values by a predetermined value, e.g., 128, such that each scaled value is an integer between 0 and 255. For example, the pixel at 20 degrees (scaled value 1) would have a normalized value of 128, the pixel at 70 degrees (scaled value 3.5) would have a normalized value of 255 (rounded down from 892), and the pixel at 10 degrees (scaled value 0.5) would have a normalized value of 64. Thus, the thermal image 300 can be normalized according to the ambient air temperature.

The thermal imaging sensor 115 can be a stereo sensor 115, i.e., the thermal imaging sensor 115 can include two data collectors that collect thermal data, and the thermal imaging sensor 115 can combine the thermal data both data collectors to generate the thermal image 300. The thermal image 300 thus can include temperature data, as determined by the collected infrared radiation values and associated to a blackbody temperature, and distance data of each pixel to the thermal imaging sensor 115. The computer 110 and/or the thermal imaging sensor 115 can determine a respective distance of each pixel in the thermal image 300 to the thermal imaging sensor 115 based on a conventional stereo distance technique, e.g., a disparity estimation algorithm, a three-dimensional mesh rectifier, etc. Thus, each pixel in the thermal image 300 can include two values: a scaled thermal data point that is an integer between 0 and 255, and a distance data point that is a distance in meters from the object 200 in the pixel to the thermal imaging sensor 115.

As shown in FIG. 4, the computer 110 can output a region of interest 400 in the thermal image 300. The "region of interest" 400 is a portion of the thermal image 300 in which the computer determines that an object 200 may be present. That is, the region of interest 400 is a portion of the thermal image 300 that may include an animal that may have a risk of collision with the vehicle 105. The computer 110 can determine a bounding box enclosing the region of interest 400 and the object 200. A "bounding box" is a rectangle that encloses all pixels of the object 200.

To identify the regions of interest 400, the thermal image 300 can be divided into a plurality of subregions 305. FIGS. 3-4 illustrate 16 subregions 305, and the computer 110 can divide the thermal image 300 into a different number of subregions 305, e.g., nine, 25, etc. The computer 110 can determine the number of subregions 305 with an optimizer program that determines the number of subregions 305 as a maximum number of subregions 305 that include objects 200 in the image 300. That is, the optimizer program can minimize a cost function, the cost function determining a number of computations performed by the computer 110 for a specified number of subregions 305 and a probability of correctly identifying the objects 200 in the thermal image 300. For example, the optimizer program can be a gradient descent algorithm that identifies a local minimum for the cost function by determining the number of subregions 305 for which the gradient of the cost function converges to zero. Having minimized the cost function, the optimizer can output the number of subregions 305 at which the cost function is minimized, and the computer 110 can divide the thermal image 300 into the output number of subregions 305.

The computer 110 can determine whether a region of interest 400 is detected in each subregion 305. That is, the computer 110 can, for each subregion, determine a respective infrared intensity threshold and determine whether each pixel in the subregion is included in a region of interest 400 based on the infrared intensity threshold. The computer 110 can, for each subregion 305, determine a histogram of thermal data values and identify a thermal data value that is most commonly present in the subregion 305, i.e., a highest bar of the histogram. This identified thermal data value can be the infrared intensity threshold for the subregion 305. The computer 110 can then determine a highest infrared intensity threshold of all of the subregions 305 as a global infrared intensity threshold for the thermal image 300. The computer 110 can compare the pixel values to the global infrared intensity threshold and assign the pixels having thermal values above the global infrared intensity threshold to a region of interest 400. That is, the subregion 305 with the highest infrared intensity threshold most likely includes the object 200, and pixels having thermal values above the infrared intensity threshold of that subregion 305 are most likely to be objects and not part of the environment. Thus, the computer 110 identifies pixels with the highest thermal data values as potential regions of interest 400 and other pixels as part of the environment.

By assigning pixels in each subregion 305 to a region of interest 400, the computer 110 can more quickly and precisely determine whether there is an object 200 approaching the vehicle 105 than using an infrared intensity threshold based on the thermal image 300 as a whole. That is, a histogram of thermal data values for the entire thermal image 300 may indicate an infrared intensity threshold that still identifies the environment, and not the object 200. Identifying infrared intensity thresholds for each subregion 305 focuses the closely-arranged pixels of the object 200 with high thermal data values, and the thus the highest infrared intensity threshold is mostly likely for a subregion in which an object 200 is present. By identifying the plurality of infrared intensity thresholds, subregions 305 that do not include an object 200 (as represented by a region of interest 400) can be identified more quickly than subregions 305 that may include the object 200, and the computer 110 can reduce false positive identifications of objects 200 in the thermal image 300 that may result from a single infrared intensity threshold based on the entire thermal image 300 without subregions 305.

The computer 110 can determine the infrared intensity threshold for each subregion 305 based on a conventional thresholding algorithm. For example, the computer 110 can use a histogram model such as Otsu's Method described in "A Threshold Selection Method from Gray-Level Histograms," *IEEE Transactions on Systems, Man, and Cybernetics*, vol. 9, no. 1, pp. 62-66, January 1979, (currently available at https://ieeexplore.ieee.org/document/4310076). The computer 110 can determine a histogram of all normalized thermal data in the thermal image 300 and compute probabilities of each thermal data value. Then, the computer 110 can determine an inter-class variance of the thermal data based on the probabilities, as described in Otsu's Method. The computer 110 can determine the infrared intensity threshold as a threshold value at which the inter-class variance of the thermal data for the subregion 305 is maximized.

The computer 110 can, upon identifying the regions of interest 400, input the thermal image 300 to a machine learning program trained to output an identification of the object 200. The machine learning program can be a neural network, as described below and shown in FIG. 6. The machine learning program can output an identification of the object 200 as an animal. That is, the machine learning program can be trained to identify animals in the regions of interest 400 identified in the thermal image 300. An animal can typically emit thermal radiation exceeding the ambient air temperature, i.e., the temperature of an animal typically exceeds the ambient air temperature. Thus, the machine learning program can be trained to identify subregions 305 in which thermal data indicate that an object 200 may be an animal and output the identification of the object 200 as an animal.

The computer 110 can identify the object 200 in the region of interest 400 based on one or more previously determined object properties. In this context, "object properties" are parameters identified about the object 200, e.g., a size, a shape, a type of animal, features of specific types of animals, etc. The object properties can be annotated onto reference images with reference animals that are used to train the machine learning program. For example, the computer 110 can train the machine learning program by minimizing a cost function that includes a classification loss factor, indicating an accuracy of identifying the object 200, and a bounding box loss factor, indicating a precision of a size and location of the bounding box enclosing the object 200. The computer 110 can train the machine learning program with the reference images until the cost function is minimized, as described below.

The computer 110 can identify a current location of the vehicle 105 and output the identification of the object 200 based on the current location. The examples of FIGS. 2-5 illustrate a rural environment, and the machine learning program can be trained to identify specific objects 200 in the rural environment. Additionally, the machine learning program can be trained to identify specific objects in an urban environment. Animals in an urban environment typically differ than animals in a rural environment, and the urban environment may include pedestrians that may not be present in the rural environment. The computer 110 can identify the current location of the vehicle 105 as one of an urban environment or a rural environment based on, e.g., an annotation to a high-resolution map provided by an external server. The machine learning program can output the identification of the object 200 as a pedestrian or an animal that typically lives in an urban environment (e.g., a pigeon, a dog, etc.) when the current location is the urban environment and as an animal that typically lives in a rural environment (e.g., a deer, a fox, etc.) when the current location is the rural environment. Alternatively or additionally, the machine learning program can output a probability of identification of the object 200, i.e., a likelihood that the identification of the object 200 is correct. When the probability is above a predetermined threshold, the computer 110 can determine that the object 200 is correctly identified. For each identification, the urban environment can have a predetermined threshold and the rural environment can have a respective predetermined threshold. The thresholds can be different, e.g., the threshold for identifying a deer in the urban environment can be greater than the threshold for identifying the deer in the rural environment because deer may be more commonly found in rural environments than urban environments, and the higher threshold for the urban environment can reduce a likelihood of a false positive identification of the deer in the urban environment. The computer 110 can determine whether the current environment is an urban environment or a rural environment based on a semantic segmentation model that classifies pixels in the thermal image 300 and classifies the environment based on the classified pixels, e.g., an Efficient Panoptical Segmentation model, currently available at https://arxiv.org/pdf/2004.02307v2.pdf.

FIG. 5 is an illustration of a predicted trajectory 500 of the object 200 in the thermal image 300. The computer 110 can predict the trajectory 500 of the object 200 based on respective region of interest 400 identified in a plurality of thermal images 300. The "trajectory" is a predicted speed and direction of travel of the object 200, represented by an arrow in FIG. 5.

The computer 110 can predict the trajectory 500 of the object 200 with an optical flow algorithm applied to a plurality of thermal images 300. The optical flow algorithm is programming of the computer 110 that determines movement of corresponding pixels in a plurality of images to predict motion of an object 200 captured by the pixels. The optical flow algorithm uses an intensity I(x, y, t) for a pixel x, y for a thermal image 300 captured at a time t to determine a direction of travel of the pixel, represented as partial derivatives with respect to the spatial coordinates $I_x$, $I_y$ moving at speed $V_x$, $V_y$ in the spatial directions, and a change of intensity of the pixel over time, represented as the partial derivative with respect to time $I_t$:

$$I_x V_x + I_y V_y = -I_t \quad (1)$$

The computer 110 can use a conventional technique to solve the above Expression, e.g., a Lucas-Kanade affine flow model, a Horn-Schunk smooth flow model, etc. The computer 110 can thus predicted the predicted trajectory 500 as a predicted speed $V = \sqrt{V_x^2 + V_y^2}$ and a predicted direction of travel $$\theta = \arctan\left(\frac{V_y}{V_x}\right),$$

where θ angle relative to a horizontal axis and arctan is the arctangent function, i.e., the function inverse of the tangent function. The computer 110 can apply the above Expression to a specified set of pixels in a first normalized thermal image 300 and a second specified set of pixels a second normalized thermal image 300, the specified set of pixels being the pixels in the region of interest 400, to predict the trajectory 500 of the object 200.

The computer 110 can determine a distance from the vehicle 105 to the object 200 based on the normalized thermal images 300. The computer 110 can determine the distance to the object 200 with a stereo distance algorithm applied to the thermal images 300, as described above. That is, the thermal imaging sensor 115 can determine respective distances between each pixel in the thermal image 300 and the thermal imaging sensor 115, and the computer 110 can identify the pixels of the object 200 in the region of interest 400 and the respective distances of those pixels of the object 200. The computer 110 can determine a representative distance value of the object 200 based on the distances of the pixels of the object 200. For example, the computer 110 can determine the representative distance value as an arithmetic mean of the distances of the pixels of the object 200.

Based on the predicted trajectory 500 and the distance of the object 200 to the vehicle 105, the computer 110 can determine risk of collision of the object 200 with the vehicle 105. In this context a "risk of collision" is measure of a likelihood that the object 200 will collide with the vehicle 105. The computer 110 can input the distance and the predicted trajectory 500 to a machine learning program trained to output a risk of collision with the object based on an input distance and predicted trajectory 500. The machine learning program trained to determine the risk of collision can be the same machine learning program trained to determine the region of interest 400 described above, i.e., the machine learning program can be trained to output the region of interest 400 including the object 200 based on an input thermal image 300, and the machine learning program can be trained to determine a risk of collision with the object 200 upon receiving the predicted trajectory 500 of the object 200 from the computer 110. For example, the machine learning program can output the risk of collision based on a predicted time to collision between the vehicle 105 and the object 200, the machine learning program trained on reference trajectories 500 annotated with times to collision between the objects 200 and the vehicle 105. Thus, the computer 110 can input the thermal image 300 to the machine learning program, predict the trajectory 500 of the object 200 based on the output region of interest 400, and receive the risk of collision based on the input predicted trajectory 500. Alternatively, the computer 110 can determine the risk of collision with a second machine learning program trained to output the risk of collision based on the predicted trajectory 500.

The machine learning program can output the risk of collision based on a classifier training technique that classifies the input trajectory 500 and distances to one of a plurality of classifications. The classifier training technique can be a conventional machine learning technique that classifies the inputs to one of the plurality of classifications, e.g., logistic regression, decision trees, gradient boosted trees, naïve Bayes, etc. Each classification of the plurality of classifications can be a different risk of collision, e.g., the plurality of classifications can include three classifications: "low risk," "medium risk," and "high risk." The output classification can be the "risk of collision" from the machine learning program. For example, when the time to collision is below a first time threshold, the machine learning program can output a risk of collision as "medium risk," indicating that the object 200 has a likelihood of colliding with the vehicle 105, and the user of the vehicle 105 can actuate one or more components 120 to avoid the collision upon prompting by the computer 110. In another example, when the time to collision is below a second time threshold, the machine learning program can output a risk of collision as "high risk," and the computer 110 can actuate one or more components, as described below, to avoid the object 200 without input from the user.

Based on the output risk of collision, the computer 110 can actuate one or more vehicle components 120 to avoid the object 200. For example, when the output risk of collision is "medium risk," the computer 110 can provide an output to a display screen indicating to a user of the vehicle 105 that the object 200 may collide with the vehicle 105. In another example, when the output risk of collision is "high risk," the computer 110 can actuate a brake to slow or stop the vehicle 105 before reaching the object 200. In yet another example, when the output risk of collision is "low risk," the computer 110 can determine not to actuate a component 120 because the object 200 is not likely to collide with the vehicle 105.

Figure 6:
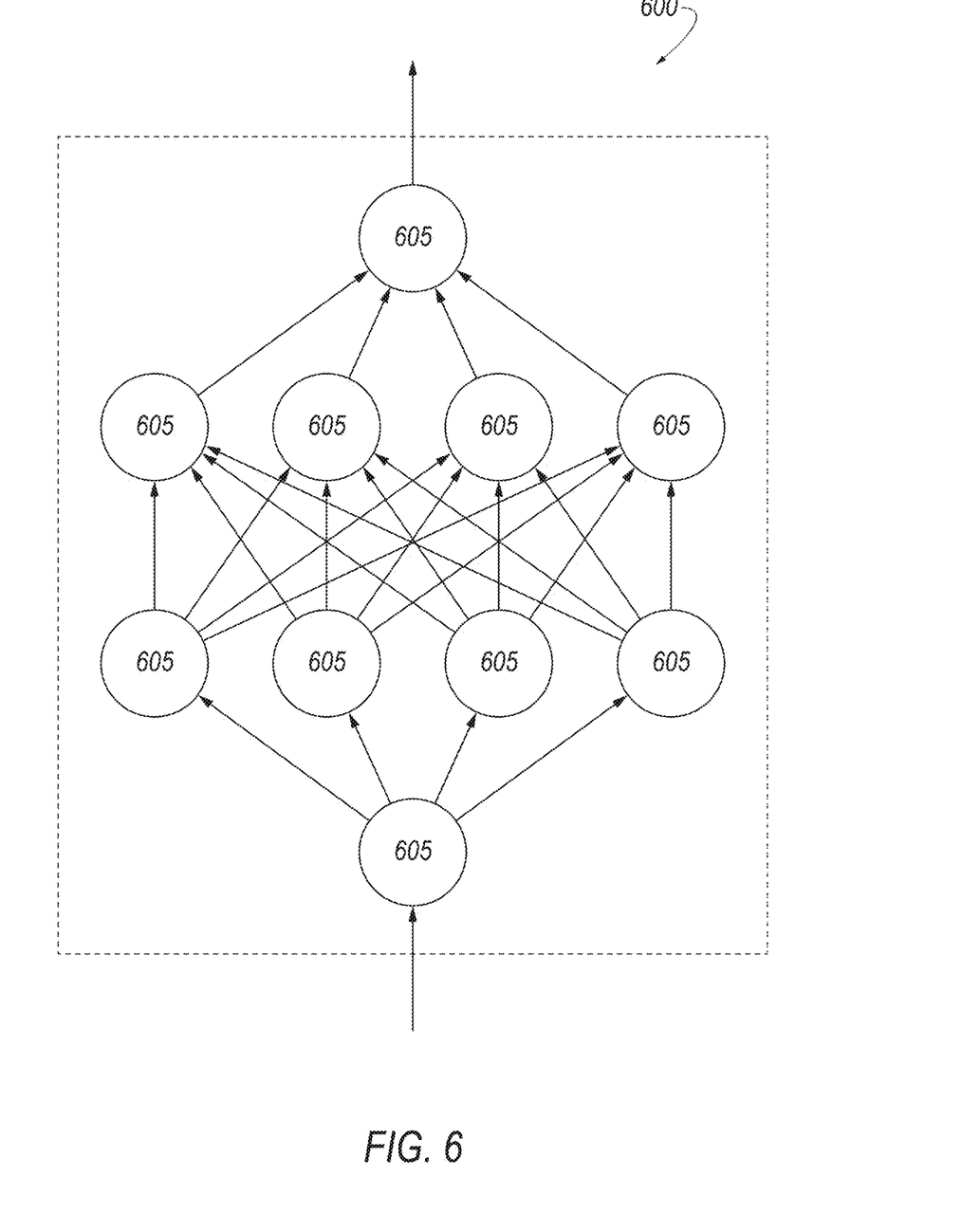
FIG. 6 is a block diagram of an example machine learning program.

FIG. 6 is a diagram of an example deep neural network (DNN) 600 that can be trained to identify a region of interest 400 enclosing an object 200 in a thermal image 300. The DNN 600 can be a software program that can be loaded in memory and executed by a processor included in a computer, for example. In an example implementation, the DNN 600 can include, but is not limited to, a convolutional neural network (CNN), R-CNN (Region-based CNN), Fast R-CNN, and Faster R-CNN. The DNN includes multiple nodes, and the nodes are arranged so that the DNN 600 includes an input layer, one or more hidden layers, and an output layer. Each layer of the DNN 600 can include a plurality of nodes 605. While FIG. 6 illustrates three hidden layers, it is understood that the DNN 600 can include additional or fewer hidden layers. The input and output layers may also include more than one node 605.

The nodes 605 are sometimes referred to as artificial neurons 605, because they are designed to emulate biological, e.g., human, neurons. A set of inputs (represented by the arrows) to each neuron 605 are each multiplied by respective weights. The weighted inputs can then be summed in an input function to provide, possibly adjusted by a bias, a net input. The net input can then be provided to an activation function, which in turn provides a connected neuron 605 an output. The activation function can be a variety of suitable functions, typically selected based on empirical analysis. As illustrated by the arrows in FIG. 6, neuron 605 outputs can then be provided for inclusion in a set of inputs to one or more neurons 605 in a next layer.

As one example, the DNN 600 can be trained with ground truth data, i.e., data about a real-world condition or state. Weights can be initialized by using a Gaussian distribution, for example, and a bias for each node 605 can be set to zero. Training the DNN 600 can include updating weights and biases via suitable techniques such as back-propagation with optimizations. Ground truth data used for training can include, but is not limited to, a reference set of images in which objects 200 are detected and annotated. The DNN 600 can be trained at the server 130 and transmitted to the computer 110 via the network 125. The server 130 can retrain the DNN 600 based on additional ground truth data collected and labeled by the computer 110, e.g., with a set of thermal images 300 in which regions of interest 400 and objects 200 are identified.

Figure 7:
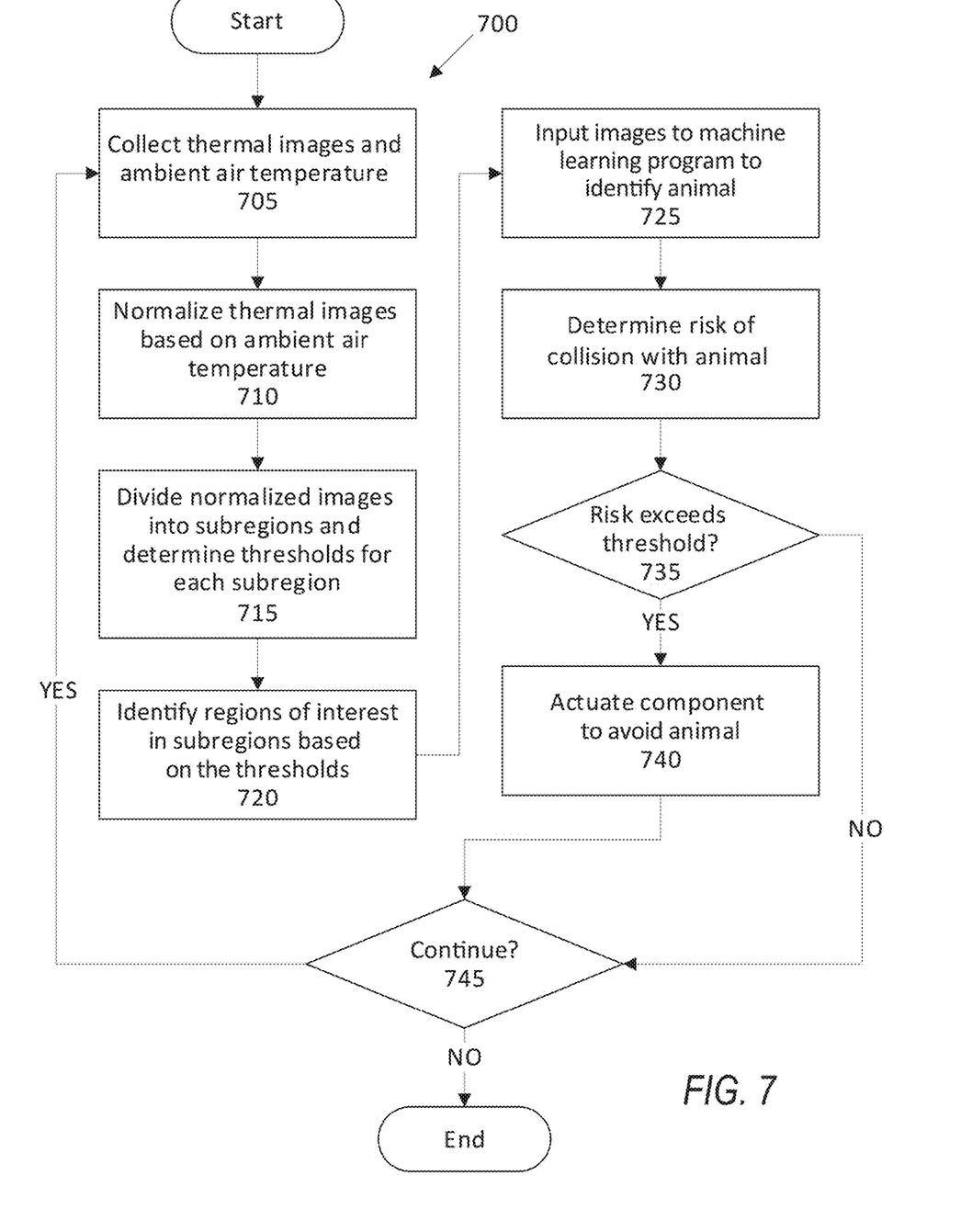
FIG. 7 is a block diagram of an example process for avoiding an object on a roadway.

FIG. 7 is a block diagram of an example process 700 for operating a vehicle 105 to avoid or mitigate a collision with an object 200. The process 700 begins in a block 705, in which a computer 110 of the vehicle 105 collects a plurality of thermal images 300 with a thermal imaging sensor 115 and detects an ambient air temperature. As described above, the thermal imaging sensor 115 can be a stereo infrared camera that collects infrared radiation emitted from objects 200 around the vehicle 105. The computer 110 can determine the ambient air temperature outside of the vehicle 105 with, e.g., a temperature sensor 115.

Next, in a block 710, the computer 110 normalizes the thermal images 300 based on the ambient air temperature. As described above, the computer 110 can scale the thermal data in the thermal images 300 based on the ambient air temperature. For example, the computer 110 can divide the thermal data values by the ambient air temperature, scaling the thermal data to a value between 0 and 255 around a specified value for the ambient air temperature, e.g., 50.

Next, in a block 715, the computer 110 divides each normalized thermal image 300 into a plurality of subregions 305 and determines respective infrared intensity thresholds for each subregion 305. As described above, the subregions 305 can be even subdivisions of the thermal image 300, e.g., 16 evenly-divided regions of the thermal image 300 as shown in FIGS. 3-4. The computer 110 can determine an infrared intensity threshold for each subregion 305 to detect objects 200 in each subregion 305. For example, as described above, the computer 110 can determine the infrared intensity threshold based on a histogram of normalized thermal data values in the subregion 305. For example, the infrared intensity threshold can be a thermal data value having a greatest value in the histogram, i.e., the thermal data value most frequently detected in the subregion 305.

Next, in a block 720, the computer 110 identifies regions of interest 400 in each subregion 305 based on the infrared intensity thresholds. As described above, the computer 110 can identify the regions of interest 400 based on whether the pixels in the subregion 305 of the object 200 exceed the infrared intensity threshold for the subregion 305. That is, an animal typically has thermal data values exceeding the infrared intensity threshold, and the environment typically has thermal data values below the infrared intensity threshold, and the computer 110 can classify pixels in each subregion 305 to regions of interest 400 according to the infrared intensity thresholds.

Next, in a block 725, the computer 110 inputs the normalized thermal images 300 with the identified regions of interest 400 to a machine learning program, such as a DNN 600, to identifies one of the objects 200 as an animal. As described above, the computer 110 can classify the object 200 in one or more of the subregions 305 as an animal based on the thermal data values and the infrared intensity thresholds and/or one or more object properties. For example, the machine learning program can, based on object properties of the object 200 in a region of interest 400, determine that the object 200 is an animal.

Next, in a block 730, the computer 110 determines a risk of collision between the vehicle 105 and the object 200 identified as an animal. The "risk of collision" is a measure of a likelihood that the object 200 will collide with the vehicle 105. As described above, the computer 110 can input a predicted trajectory 500 and the thermal images 300 to a machine learning program, such as the DNN 600 or a separate binary classifier program, to output a risk of a collision between the vehicle 105 and the object 200.

Next, in a block 735, the computer 110 determines whether the risk of collision exceeds a threshold. As described above, the computer 110 can compare the risk of collision output from the machine learning program to one of a plurality of risk thresholds, the risk thresholds based on respective likelihoods that the object 200 will collide with the vehicle 105. For example, the risk threshold can be based on a predicted time to collision between the vehicle 105 and the object 200. When the risk of collision exceeds the threshold, the process 700 continues in a block 740. Otherwise, the process 700 continues in a block 745.

In the block 740, the computer 110 actuates one or more components 120 to avoid the animal. For example, the computer 110 can actuate a brake to slow and/or stop the vehicle 105 prior to reaching the animal. In another example, the computer 110 can provide an alert on a user display interface to prompt a user of the vehicle 105 to slow or stop the vehicle 105.

In the block 745, the computer 110 determines whether to continue the process 700. For example, the computer 110 can determine to continue the process 700 when the vehicle 105 is still moving toward a destination. In another example, the computer 110 can determine not to continue the process 700 when the vehicle 105 is parked and powered off. If the computer 110 determines to continue, the process 700 returns to the block 705. Otherwise, the process 700 ends.

Computing devices discussed herein, including the computer 110, include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 110 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 700, one or more of the steps could be omitted, or the steps could be executed in a different order than shown in FIG. 7. In other words, the descriptions of systems and/or processes herein are provided for the purpose of illustrating certain embodiments and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

Ordinal adjectives such as "first" and "second" are used throughout this document as identifiers and are not intended to signify importance or order.

The invention claimed is:

1. A system, comprising a computer including a processor and a memory, the memory storing instructions executable by the processor to:
   collect a plurality of thermal images forward of a vehicle;
   normalize thermal data in the plurality of thermal images based on an ambient air temperature to generate a plurality of normalized thermal images;
   divide each of the plurality of normalized thermal images into a plurality of subregions that include respective pluralities of pixels, each subregion having a respective infrared intensity threshold based on thermal values of the pixels in the subregion;
   assign one or more of the pixels in a respective subregion to a region of interest based on the thermal values of the pixels in the respective subregion and the infrared intensity threshold for the respective subregion;

input the plurality of normalized thermal images to a machine learning program trained to output an identification of an object in the region of interest based on the ambient air temperature and a risk of collision between the vehicle and the object; and
actuate a vehicle component based on the identification of the object and the risk of collision with the object.

2. The system of claim 1, wherein the object is an animal, and the risk of collision is based on predicted trajectory of the animal, the predicted trajectory of the animal based on a difference of thermal data between a specified set of pixels in a first normalized thermal image and a second specified set of pixels in a second normalized thermal image.

3. The system of claim 1, wherein instructions further include instructions to determine a distance to the object and a predicted trajectory of the object based on the normalized thermal images and to input the distance and the predicted trajectory to the machine learning program, the machine learning program being trained to output the risk of collision with the object based on the distance and the predicted trajectory.

4. The system of claim 3, wherein the instructions further include instructions to predict a trajectory of the vehicle and to input the predicted trajectory of the vehicle to the machine learning program, the machine learning program being trained to output the risk of collision with the object based on the predicted trajectory of the object and the predicted trajectory of the vehicle.

5. The system of claim 1, wherein the instructions further include instructions to identify the object based on the thermal data in the plurality of normalized thermal images indicating a temperature exceeding the ambient air temperature.

6. The system of claim 1, wherein the instructions further include instructions to identify a region of interest in each normalized thermal image based on one or more previously determined object properties.

7. The system of claim 1, wherein the instructions further include instructions to actuate a brake based on the risk of collision with the object.

8. The system of claim 1, wherein the instructions further include instructions to provide an output to a display screen based on the risk of collision with the object.

9. The system of claim 1, wherein the instructions further include instructions to generate a bounding box enclosing the object.

10. The system of claim 1, wherein the instructions further include instructions to identify a current location of the vehicle and to output the identification of the object based on the current location of the vehicle.

11. The system of claim 10, wherein the instructions further include instructions to identify the current location of the vehicle as one of an urban environment or a rural environment, to output the identification of the object as a pedestrian when the current location is the urban environment, and to output the identification of the object as an animal when the current location is a rural environment.

12. A method, comprising:
collecting a plurality of thermal images forward of a vehicle;
normalize thermal data in the plurality of thermal images based on an ambient air temperature to generate a plurality of normalized thermal images;
dividing each of the plurality of normalized thermal images into a plurality of subregions that each include respective pluralities of pixels, each subregion having a respective infrared intensity threshold based on thermal values of the pixels in the subregion;
assigning one or more of the pixels in a respective subregion to a region of interest based on the thermal values of the pixels in the respective subregion and the infrared intensity threshold for the respective subregion;
inputting the plurality of normalized thermal images to a machine learning program trained to output an identification of an object in the region of interest based on the ambient air temperature and a risk of collision between the vehicle and the object; and
actuating a vehicle component based on the identification of the object and the risk of collision with the object.

13. The method of claim 12, wherein the object is an animal, and the risk of collision is based on predicted trajectory of the animal, the predicted trajectory of the animal based on a difference of thermal data between a specified set of pixels in a first normalized thermal image and a second specified set of pixels in a second normalized thermal image.

14. The method of claim 12, further comprising determining a distance to the object and a predicted trajectory of the object based on the normalized thermal images and inputting the distance and the predicted trajectory to the machine learning program, the machine learning program being trained to output the risk of collision with the object based on the distance and the predicted trajectory.

15. The method of claim 13, further comprising predicting a trajectory of the vehicle and inputting the predicted trajectory of the vehicle to the machine learning program, the machine learning program being trained to output the risk of collision with the object based on the predicted trajectory of the object and the predicted trajectory of the vehicle.

16. The method of claim 12, further comprising identifying the object based on the thermal data in the plurality of normalized thermal images indicating a temperature exceeding the ambient air temperature.

17. The method of claim 12, further comprising actuating a brake based on the risk of collision with the object.

18. The method of claim 12, further comprising identifying a current location of the vehicle and outputting the identification of the object based on the current location of the vehicle.

* * * * *